United States Patent [19]
Hackbarth

[11] Patent Number: 5,758,021
[45] Date of Patent: May 26, 1998

[54] SPEECH RECOGNITION COMBINING DYNAMIC PROGRAMMING AND NEURAL NETWORK TECHNIQUES

[75] Inventor: Heidi Hackbarth, Korntal-Münchingen, Germany

[73] Assignee: Alcatel N.V., Amsterdam, Germany

[21] Appl. No.: 943,307

[22] Filed: Sep. 10, 1992

Related U.S. Application Data

[63] Continuation-in-part of Ser. No. 897,661, Jun. 12, 1992, abandoned.

[51] Int. Cl.$^6$ ........................................................ G10L 5/00
[52] U.S. Cl. ........................................... 395/2.41; 395/2.5
[58] Field of Search ............................. 395/2, 2.11, 2.41,
395/2.5, 2.51, 2.52, 2.53; 381/41–43

[56] References Cited

U.S. PATENT DOCUMENTS

| | | | |
|---|---|---|---|
| 4,949,382 | 8/1990 | Griggs | 395/2.44 |
| 5,005,203 | 4/1991 | Ney | 395/2.64 |
| 5,058,166 | 10/1991 | Ney et al. | 395/2.63 |

FOREIGN PATENT DOCUMENTS 2 230 370  10/1990  United Kingdom ............... G10L 5/06

OTHER PUBLICATIONS

Krause et al., "Scaly Artificial Neural Networks for Speaker-Independent Recognition of Isolated Words," IEEE Proceedings of ICASSP 1989, Glasgow, UK, 4 pages.

Ney, "The Use of a One-Stage Dynamic Programming Algorithm for Connected Word Recognition," IEEE Transactions on Acoustics, Speech, and Signal Processing, vol. ASSP–32, No. 2, Apr. 1984, pp. 263–271.

Sakoe et al., "Dynamic Programming Algorithm Optimization for Spoken Word Recognition," IEEE Transactions on Acoustics, Speech, and Signal Processing, vol. ASSP–26, No. 1, Feb. 1978, pp. 43–49.

Tom et al., "Short Utterance Recognition Using a Network With Minimum Training," 8343 Neural Networks, 4 (1991), No. 6, Pergamon Press, pp. 711–722.

Bourlard et al., "Mering Multilayer Perceptions and Hidden Markov Modeles: Some Experiments in Continuous Speech Recognition," Int'l Computer Science Institute, Jul. 1989, pp. 1–18.

*Primary Examiner*—David D. Knepper
*Attorney, Agent, or Firm*—Spencer & Frank

[57] ABSTRACT

Recognition of speech with successive expansion of a reference vocabulary, can be used for automatic telephone dialing by voice input. Neural and conventional recognition methods are performed in parallel so that during training and configuration of the neural network, a conventional recognizer operating according to the dynamic programming principle has available newly added word patterns as references for immediate use in recognition. Upon completion of the training and configuration, the neural network takes over the recognition of the now expanded vocabulary.

10 Claims, 5 Drawing Sheets

SPEECH RECOGNITION COMBINING DYNAMIC PROGRAMMING AND NEURAL NETWORK TECHNIQUES

CROSS-REFERENCE TO RELATED APPLICATIONS

This application claims the priority of Application Ser. No. P 41 20 308.9, filed Jun. 20th, 1991, in the Federal Republic of Germany, the subject matter of which is incorporated herein by reference.

This application is a continuation in part of U.S. application Ser. No. 07/897,661 filed Jun. 12th 1992, now abandoned, and claims all rights of priority therein.

BACKGROUND OF THE INVENTION

1. Field of the Invention

The present invention relates to a speech recognition device including a neural network and to a speech recognition method with successive expansion of reference vocabularies.

2. Background Information

It is known to employ so-called neural networks having a hierarchical structure to detect patterns. In such networks each element of a higher layer is influenced by elements of a lower layer, with typically each element of one layer being connected with all elements of the layer below it (see, for example, the publication by A. Krause and H. Hackbarth (the present inventor), entitled "Scaly Artificial Neural Networks for Speaker-Independent Recognition of Isolated Words", IEEE Proceedings of ICASSP 1989, Glasgow, UK, hereby incorporated by reference which includes further literature references). Compared to conventional speech recognition methods, neural networks offer the advantage of inherent robustness with respect to interfering noise.

However, a drawback of the neural network techniques, in principle, is the relatively long training phase required for presently available computers. If it is necessary, for example, in actual use of a neural speech recognizer to expand the reference vocabulary by but a single word, the entire neural network must be retrained, a process in which additional output elements are added and all equilibrium parameters are re-established. This means that a word newly introduced into the reference vocabulary can be recognized only after an off-line learning phase is completed and, under certain circumstances, this learning phase may take several hours.

One of the known conventional speech pattern recognition methods is the so-called dynamic programming method. Dynamic programming is generally useful for performing time normalization to expand or compress speech patterns in time. In such a conventional speech pattern recognition method, a word spoken for the first time to train a voice recognizer is stored directly as a reference pattern in a voice pattern memory (see, e.g., the publication by H. Ney, entitled "The Use of a One-Stage Dynamic Programming Algorithm for Connected Word Recognition", IEEE Transactions on Acoustics, Speech, and Signal Processing, Apr., 1984, hereby incorporated by reference, which includes further literature references). This method offers the advantage that the reference speech pattern is available for use by the speech recognizer within a few seconds in contrast with the neural network techniques. However, a drawback of dynamic programming is its sensitivity to interfering noises, which sensitivity is greater than that of the neural network methods. Real time speech recognition is only ensured in either method for small reference vocabularies (about 70 to 100words, depending on the processor power).

SUMMARY OF THE INVENTION

It is an object of the invention to provide a robust speech recognition system which is immediately available upon successive expansion of the vocabulary by individual words or word groups. This is accomplished according to the invention by a device having a trained neural network for the recognition of speech, wherein in addition to the neural network, a conventional speech recognizer operating according to the dynamic programming principle, for example, is provided to place newly spoken words directly into a stored vocabulary of the device in the form of reference patterns in a speech pattern memory accessible to the conventional recognizer for immediate use in making a recognition decision in parallel with processing of the words by the neural network in a network retraining operation.

A method of solving the above-mentioned problem includes a method of speech recognition with successive expansion of a reference vocabulary, including a combination of neural and conventional methods. In response to a word being spoken for the first time to train the speech recognition device, the method stores the word spoken for the first time as a new reference pattern in a speech pattern memory and makes this new reference pattern available for immediate use by a conventional recognizer operating according to the dynamic programming principle. Simultaneously, training and configuration of the neural network is initiated.

The vocabulary expansion on the basis of the neural network requires long retraining of the entire network which can take up to several hours, whereas the conventional speech recognizer, operating according to the dynamic programming principle for example, has the newly added word patterns available as a reference for immediate use in reaching a recognition decision.

Two variations of the basic method are also disclosed. For example, the conventional speech recognizer for recognizing a word spoken during the training phase of the neural network may be activated only for the newly added word patterns, or for all word patterns, until the otherwise more robust neural network is trained to the expanded set of word patterns and again takes over recognition with the complete, now expanded vocabulary. Therefore, with the aid of the present invention it is possible to advantageously recognize speech even during the training phase of the neural network.

BRIEF DESCRIPTION OF THE DRAWINGS

The invention will be described with reference to the accompanying drawings, in which:

FIG. 1 and 1a shows, as case 1, the very first utterance of vocabulary N;

FIG. 2 and 2ashows, as case 2, the expansion by means of new names M.

DESCRIPTION OF THE PREFERRED EMBODIMENTS

The dialing of a telephone to make a connection by voice will now be described with reference to FIGS. 1 and 2 according to an embodiment of the invention.

Figure 1:
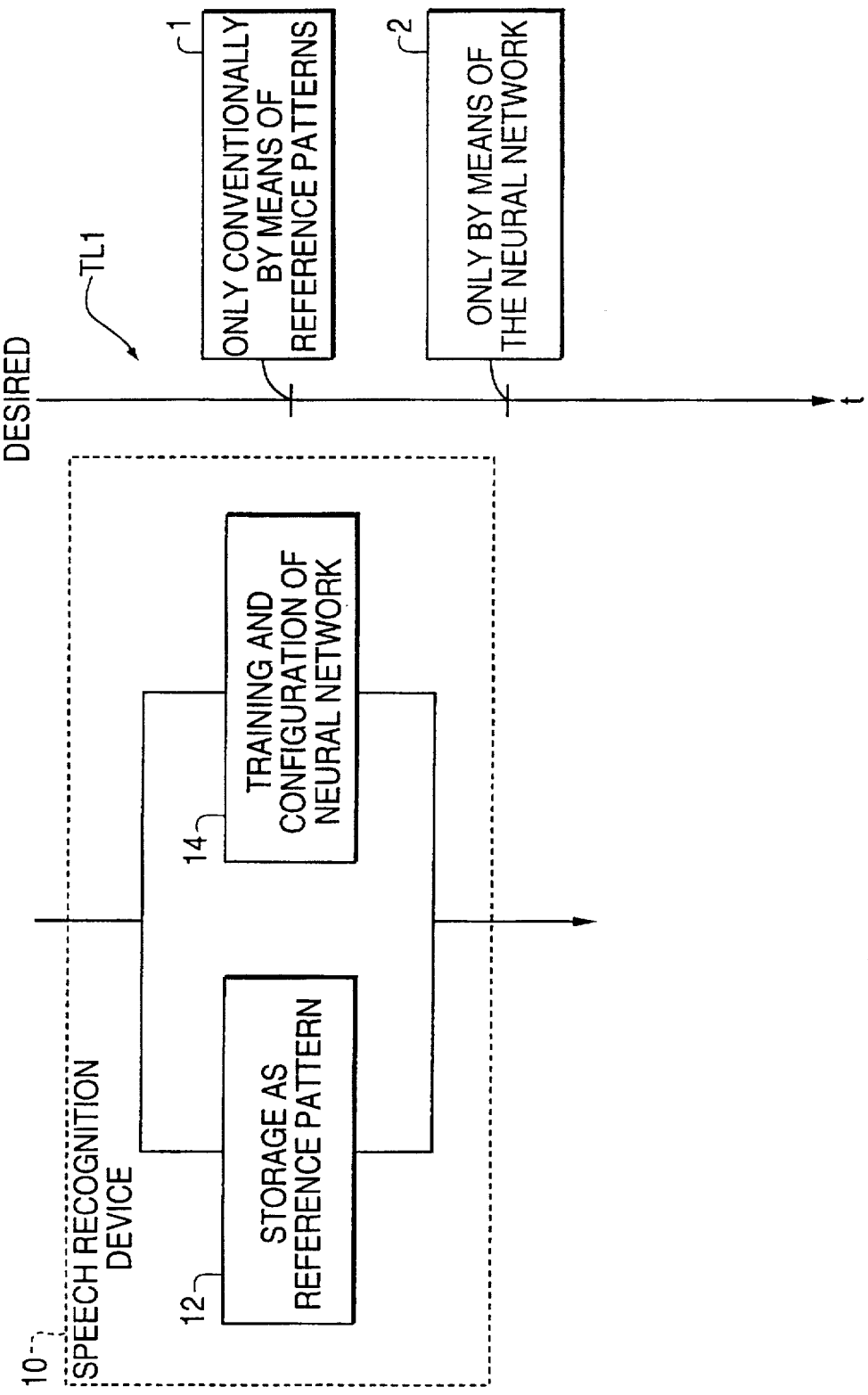

During the very first utterance of vocabulary (N) as shown in FIG. 1, the names spoken by the user (possibly several times) are stored in the speech recognition device in a speech pattern memory in the form of reference patterns. This is done in real time on an order of magnitude of seconds. In parallel therewith, the spoken names are processed in the neural network of the speech recognition device. In this way, the neural network is trained and configured over a period of several hours. A name, for example, subsequently input by voice for dialing the telephone to make a connection during the training of the neural network then activates the conventional recognizer which, operating according to the dynamic programming principle for example, compares the spoken name with all the reference patterns previously stored in the speech pattern memory, i.e., vocabulary (N), to perform recognition. The training of the neural network continues to take place as a background process or program. After completion of the training and initial configuration of the neural network, names subsequently input by voice in order to dial the telephone to make a connection are recognized exclusively by means of the neural network which, as previously mentioned, is more robust with respect to noise.

Figure 2:
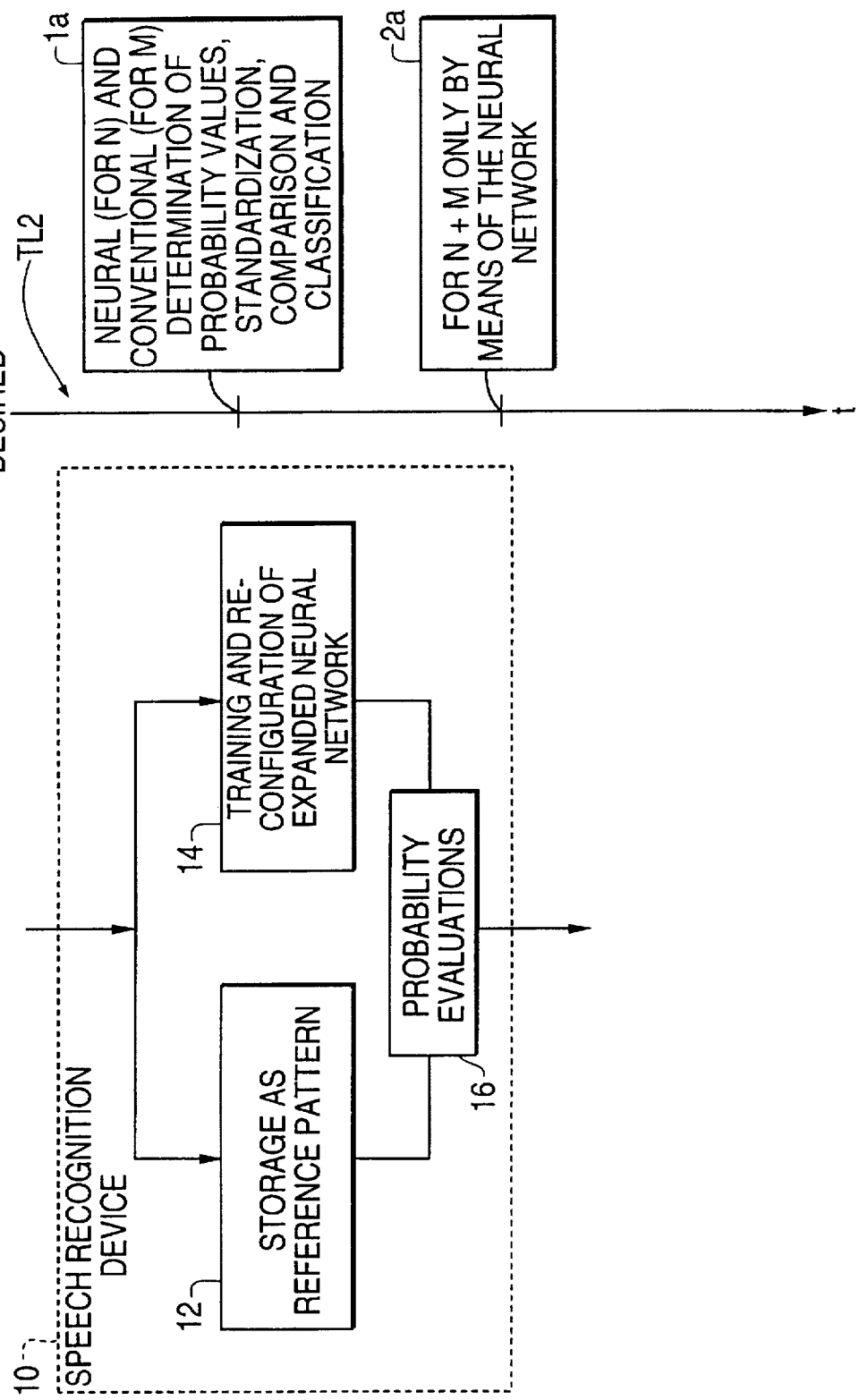

If now the list of participants, i.e., vocabulary (N) to be dialed, as shown in FIG. 2, is to be expanded by M new names, the new names uttered by the user are again first stored as reference patterns. In parallel therewith, it is necessary to supplement the output layer of the neural network by M neural elements, to construct the associated connections and to retrain the weightings on the connections between all elements. This reconfiguration, i.e., retraining, of the neural network takes several hours as in the initial training. The previous "old" neural network, which was trained to vocabulary (N), remains in effect during retraining, i.e., vocabulary (N) is not lost.

If the user wishes to utilize automatic telephone dialing during this retraining of the neural network phase and speaks a name, retraining is interrupted and both recognizers are activated. The "old" neural network compares the presently spoken name with the original vocabulary N and the result is a hypothetical word that is given a first probability value. The presently spoken name is also compared in the conventional dynamic programming manner in the speech pattern memory with the M newly added reference patterns and here, too, a hypothetical word results which is given a second probability value. A conventional routine here determines with which one of the newly added names the presently spoken name coincides best and how well, i.e., to what degree does it constitute a match. The greater one of the two probability values, after appropriate standardization, determines the most probable spoken word so that finally there is only a single candidate for the spoken name and recognition is completed. Retraining of the neural network is recommenced. After completion of the neural network retraining phase, the more robust neural network again takes over recognition with the new total vocabulary (N+M).

The described method is subject to the following variation in accordance with another embodiment of the invention.

While the neural network is being expanded by new names M, i.e., is being retrained, the conventional recognizer takes over the recognition for the entire vocabulary (N+M) when there is a voice input (e.g., use of the automatic telephone dialing feature), that is, it compares the reference patterns for both vocabulary (N) and new names M. The normal recognition processing then subsequently takes place as described before in connection with FIG. 1 for the vocabulary (N). In this variation, the retraining of the previous "old" neural network, trained to vocabulary (N), need not be interrupted and the "old" neural network activated. The time consuming probability evaluations and their standardization for the purpose of combining the outputs of the two methods are also no longer required. However, this simplification of the process may lead to a reduction in robustness relative to interfering noises since only the conventional recognition is used until completion of the neural network retraining process.

A proprietary neural network architecture developed by the present inventor for use by the assignee of the present invention will now be briefly described by way of example. Other neural network architectures, or variations of the below described network, may be used in principle with the present invention without departing from the scope thereof (see for example A. Krause and H. Hackbarth, "Scaly Artificial Neural Networks for Speaker-Independent Recognition of Isolated Words", IEEE Proceedings of ICASSP 1989, Glasgow, UK.).

Conventional speaker-independent speech pattern recognition schemes, such as dynamic time warping or hidden Markov modelling, are only suitable for small vocabularies of 5 to 20 words at high recognition rates (Wilpon, J.G. et al., 1988, "Isolated Word Recognition Over DDD Telephone Network Results of Two Extensive Field Studies," IEEE, ICASSP (1), 55–58; U.S. Pat. No. 4,587,670, "Hidden Markov Model Speech Recognition Arrangement") and for larger vocabularies (70 to 100 words) the recognition rates decrease considerably. In addition, speaker-independent speech recognition necessitates recording utterances of a large number of test speakers (about 100 to 1000 speakers) and processing their speech patterns in a training phase in order to have a sufficient amount of pronunciation variants for the reference data to be stored.

It is also known to use neural networks for speech recognition which have a hierarchical structure. In such networks, each element of a higher-level layer of elements is influenced by a lower-level layer, with each element of a layer typically connected to all elements of the underlying layer.

Neural networks which are constructed from time-delay networks with equal weighting factors have been investigated for speaker-independent isolated-word recognition (Bottou, L., Lienard, J.S., 1988, "Multi-Speaker Digit Recognition," Int'l. Conf. "Connectionism in Perspective," Zurich, Switzerland, CH 38, hereby incorporated by reference).

A proprietary neural network architecture of the assignee provides for automatic pattern recognition, e.g., speech pattern recognition, which permits a high recognition rate with minimum complexity.

Figure 3:
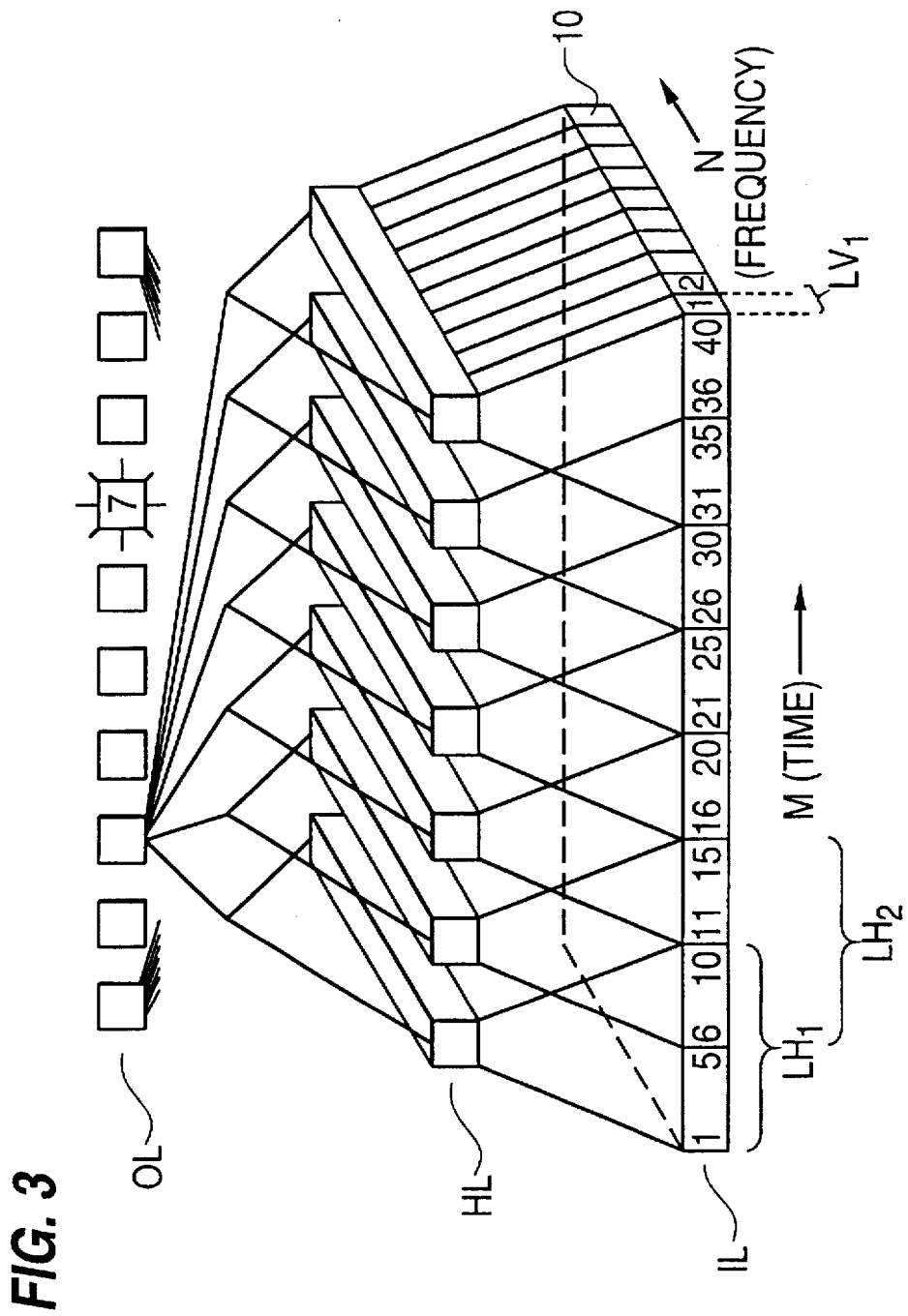
FIG. 3 shows a proprietary neural network architecture for use with an embodiment of the invention.

Such a neural network architecture is illustrated in FIG. 3 for automatic pattern recognition and consists of at least: one input layer (IL) formed by a two-dimensional array of M by N neural elements, where M equals the number of feature vectors derived from an input speech signal, and N equals the number of coefficients per feature vector; one hidden layer (HL) constituted by a two-dimensional array each of whose elements is formed from a differently weighted sum value of the amplitudes of a portion of the input layer (IL) having a size of LH by LV, where LH is less than M, and LV is less than N, with the portions being chosen so that adjacent portions overlap one another in at least one direction; and one one-dimensional output layer (OL) whose elements are formed from weighted sum values of all elements of the hidden layer (HL), with the element having the greatest sum value corresponding to the pattern to be recognized.

Particularly by the formation of the elements of the hidden layer (HL) by means of overlapping portions of the input layer (IL), a considerable reduction of complexity is achieved as compared to conventional neural network architecture having full interconnection of the two layers. This overlapping interconnection allows for the fact that only word sections limited in time contain important information for analysis (e.g., formant changes), while acoustic features, e.g., at the beginning and end of a word, are independent of each other.

A reduction of the ratio of the number of elements of the input layer (IL) to the number of elements of the hidden layer (HL) to 10:1 in the frequency dimension has proved very effective in this neural network architecture.

Furthermore, with the architecture according to the assignee's proprietary neural network, only relatively few test speakers (individuals) are necessary for achieving speaker-independent speech recognition, e.g., about 15 test persons for a 50-word vocabulary, compared to at least 100 test persons with conventional methods.

FIG. 3 shows the basic structure of a neural network in accordance with the assignee's proprietary architecture. An input layer (IL) containing the speech pattern to be recognized is constituted by a two-dimensional array of M by N neural elements, where M is the number of feature vectors derived from the input speech signal, and N is the number of frequency-dependent coefficients per feature vector. In the network shown, M=40 and N=9. The input layer thus represents a two-dimensional array of 360 elements. A first dimension of the array corresponds to time, and a second dimension to frequency, and the amplitude of the feature vectors is the time-frequency energy density.

The input layer (IL) is followed by a hidden layer (HL) which is also constituted by a two-dimensional array. According to this architecture, each element of the hidden layer (HL) is formed from a differently weighted sum value of the amplitudes of a portion of the input layer (IL) having a size of LH by LV, where LH is less than M, and LV is less than N.

The portions are chosen so that adjacent portions overlap one another, preferably by half in the time dimension (axis M, as illustrated). In addition, the ratio of the number of elements of the input layer (IL) to the number of elements of the hidden layer (HL) is reduced to 10:1 in the frequency axis (N). As a result, for each portion, LH=10 and LV=1, as shown in FIG. 3, resulting in a two-dimensional array of 70 elements for the hidden layer (HL).

The first element of the hidden layer (HL) represents the weighted sum value of amplitudes of (M=1 to M=10)×N=1 neural elements of the input layer (IL). Similarly, the second and following elements represent the weighted sums of amplitudes of (M=6 to M=15)×N=1 elements to the weighted sum of amplitudes of (M=31 to M=40)×N=1 elements, respectively.

This proprietary architecture with overlapping interconnection of the input layer (IL), as mentioned above, allows for the fact that only sections in the speech signal which are limited in time (e.g., formants) are of interest for the analysis, while the acoustic features, e.g., at the beginning or end of a word, are independent of each other. In addition to the fact that complexity is considerably reduced, the negative interfering effects that may arise with complete interconnection are avoided.

The hidden layer (HL) may be followed by one or more one-dimensional hidden layers (not shown) whose elements are formed from weighted sum values of all elements of the preceding layer.

In the architecture shown in FIG. 3, the hidden layer (HL) is followed by a one-dimensional output layer (OL) whose seven elements are formed from weighted sum values of all elements of the hidden layer (i.e., full interconnection). The element of the output layer (OL) having the greatest sum value, here indicated as No. 7, corresponds to the pattern to be recognized.

The different weighting factors for the strengths of the connections between every two neural elements are determined by the well known "error back propagation" routine (Rumelhart, D.E., Hinton, G.E., Williams, R.J. (1986), "Learning Internal Representations by Error Propagation," in Rumelhart, D.E., McClelland, J.L. (eds), "Parallel Distributed Processing: Explorations in the Microstructure of Cognition," Vol. I, Foundations, MIT Press, Ch. 8, 318–362, hereby incorporated by reference).

With the assignee's proprietary neural network architecture, in addition to a considerable reduction of complexity, very low error rates of, e.g., 2.5% for 10 words or 4% for 20 words, were achieved during speaker-independent isolated-word recognition, using only 12 test persons in the training phase. Thus, with this architecture, correspondingly good recognition performance can be provided at greatly reduced cost in comparison with conventional techniques.

Dynamic programming is a well known technique, useful for a method of recognizing a speech signal derived from coherently spoken words and consisting of a temporal sequence of speech values, each of which indicates a section of the speech signal. In such a recognition method, the speech values (patterns) are compared with given stored values (reference patterns).

Figure 4:
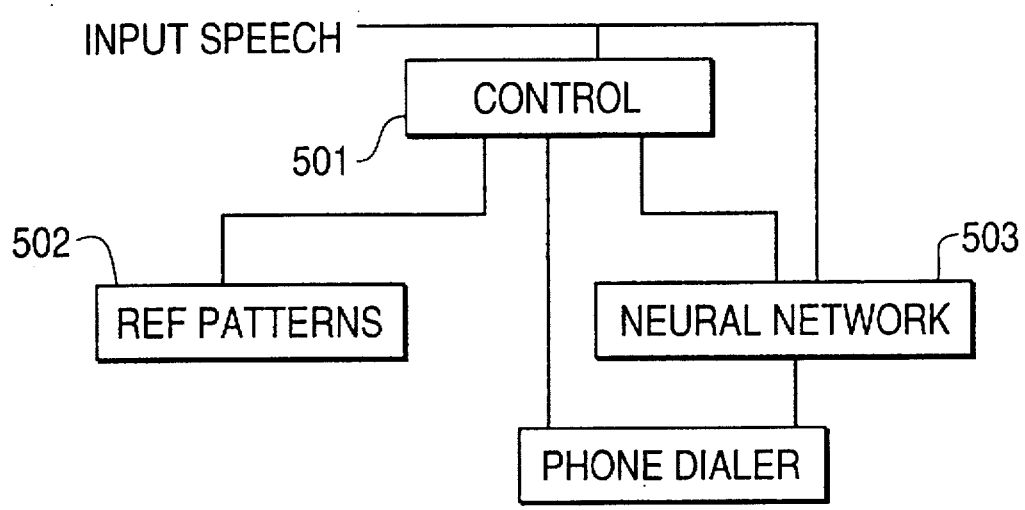
FIG. 4 shows a diagram of a one-stage dynamic programming routine for use with an embodiment of the invention.

During recognition of a speech signal, a time adaptation of the signal to be recognized to the sequences of reference values of the individual words is carried out by means of dynamic programming. A self-explanatory diagram of the onestage dynamic programming routine from Ney ("The Use of a One-Stage Dynamic Programming Algorithm for Connected Word Recognition", IEEE Transactions on Acoustics, Speech, and Signal Processing, Apr., 1984) is shown in FIG. 4. Such a routine may be advantageously used in the conventional speech recognition method/recognizer using reference patterns which is combined with the neural network according to an embodiment of the present invention. A detailed explanation of the illustrated dynamic programming routine is not considered necessary to practice the present invention, and the interested reader is referred to the Ney article.

Figure 5:
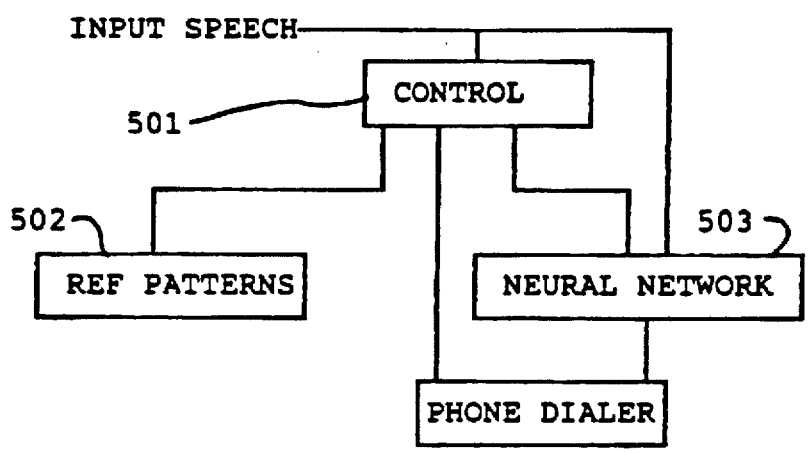
FIG. 5 shows a block diagram of an embodiment of a device according to the present invention

FIG. 5 shows a simple functional block diagram of an embodiment of a device according to the present invention incorporating at least one controller 501 for implementing both a conventional recognition utilizing reference patterns stored in reference pattern memory 502, and a neural network speech recognizer 503, under control of an operating program, which operates according to the flow in FIGS. 1 or 2, in program memory. One skilled in the data processing arts will realize that the present invention is not limited to the illustrated device, and may be implemented in other ways without departing from the scope of the invention as defined in the claims. For example, both the neural network and the conventional speech recognizer could be implemented as separate programs or subroutines performed by a single processor, or could be implemented as separate dedicated processing circuitry interfaced by a control program and hardware.

It will be understood that the above description of the present invention is susceptible to various modifications, changes and adaptations, and the same are intended to be comprehended within the meaning and range of equivalents of the appended claims.

APPENDIX

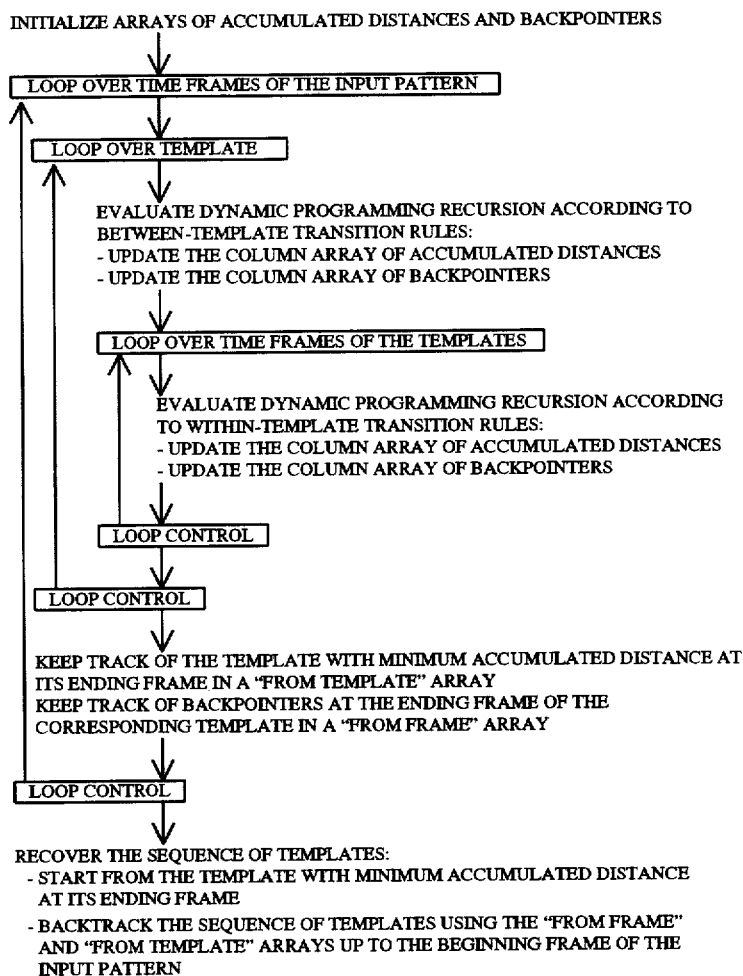

INITIALIZE ARRAYS OF ACCUMULATED DISTANCES AND BACKPOINTERS
↓
LOOP OVER TIME FRAMES OF THE INPUT PATTERN
↓
LOOP OVER TEMPLATE
↓
EVALUATE DYNAMIC PROGRAMMING RECURSION ACCORDING TO BETWEEN-TEMPLATE TRANSITION RULES:
- UPDATE THE COLUMN ARRAY OF ACCUMULATED DISTANCES
- UPDATE THE COLUMN ARRAY OF BACKPOINTERS
↓
LOOP OVER TIME FRAMES OF THE TEMPLATES
↓
EVALUATE DYNAMIC PROGRAMMING RECURSION ACCORDING TO WITHIN-TEMPLATE TRANSITION RULES:
- UPDATE THE COLUMN ARRAY OF ACCUMULATED DISTANCES
- UPDATE THE COLUMN ARRAY OF BACKPOINTERS
↓
LOOP CONTROL
↓
LOOP CONTROL
↓
KEEP TRACK OF THE TEMPLATE WITH MINIMUM ACCUMULATED DISTANCE AT ITS ENDING FRAME IN A "FROM TEMPLATE" ARRAY
KEEP TRACK OF BACKPOINTERS AT THE ENDING FRAME OF THE CORRESPONDING TEMPLATE IN A "FROM FRAME" ARRAY
↓
LOOP CONTROL
↓
RECOVER THE SEQUENCE OF TEMPLATES:
- START FROM THE TEMPLATE WITH MINIMUM ACCUMULATED DISTANCE AT ITS ENDING FRAME
- BACKTRACK THE SEQUENCE OF TEMPLATES USING THE "FROM FRAME" AND "FROM TEMPLATE" ARRAYS UP TO THE BEGINNING FRAME OF THE INPUT PATTERN

What is claimed is:

1. A speech recognition device including:
 a trained neural network for the recognition of speech, and
 a conventional speech recognizer operating according to the dynamic programming principle for placing newly spoken words directly into a stored vocabulary of the device in the form of reference patterns in a speech pattern memory accessible to the conventional recognizer for immediate use in making a recognition decision in parallel with a processing of the words by the neural network for a network retraining operation.

2. A method of speech recognition with successive expansion of a reference vocabulary, including a combination of neural and conventional methods wherein in response to a word being spoken for the first time to train the speech recognition device the method comprises:
 (a) storing the word spoken for the first time as a new reference pattern in a speech pattern memory and making this new reference pattern available for immediate use in making a recognition decision by a conventional recognizer operating according to the dynamic programming principle; and
 (b) simultaneously initiating training and configuration of the neural network to subsequently recognize the word spoken for the first time.

3. A method according to claim 2, wherein an already existing neural network is maintained until the training and configuration of the neural network are completed;
 a word spoken, during the training of the neural network, for recognition by the speech recognition device interrupts the training of the neural network and activates the existing neural network to furnish a first probability value from a previous vocabulary for the word spoken during training and simultaneously activates the conventional recognizer which compares the word spoken during training with the new reference pattern from the speech pattern memory and determines a second probability value; and
 the first and second probability values are standardized and compared with one another to make a recognition decision.

4. A method according to claim 2, wherein a word spoken, during the training of the neural network, for recognition by the speech recognition device activates only the conventional recognizer which thereafter compares the word spoken during training with all reference patterns from the speech pattern memory, including the new reference speech pattern, and makes a recognition decision.

5. A method according to claim 3, wherein, upon completion of the training and configuration of the neural network, the neural network exclusively takes over recognition using the now expanded vocabulary.

6. A method according to claim 4, wherein, upon completion of the training and configuration of the neural network, the neural network exclusively takes over recognition using the now expanded vocabulary.

7. A speech recognition apparatus comprising:

pattern recognition means, for receiving input: speech, processing the input speech to form reference speech patterns, storing the reference speech patterns as a first vocabulary during an initial training operation, for subsequently receiving input speech, processing the input speech to form input speech patterns, and comparing the input speech patterns with the previously processed reference speech patterns to find a match during a recognition operation, and for forming a second expanded vocabulary of reference speech patterns, including the first vocabulary reference speech patterns and at least one new reference speech pattern, when a match is not found for an input speech pattern in the recognitions operation; and neural network means operating in parallel with the pattern recognition means, for receiving the input speech and processing the input speech to form a first neural network corresponding to the first vocabulary during an initial configuration operation, for subsequently receiving input speech and processing the input speech to reach a recognition decision, and for reconfiguring the neural network to form a second expanded neural network, including the first neural network corresponding to the first vocabulary, when subsequently input speech is received which does not result in a positive recognition decision.

8. The speech recognition apparatus according to claim 7, wherein during the initial configuration and reconfiguration of the neural network, speech recognition is performed exclusively by the pattern recognition means, and wherein the neural network means otherwise performs speech recognition exclusively.

9. The speech recognition apparatus according to claim 7, wherein during the reconfiguration of the neural network, upon the inputting of speech, the reconfiguration is temporarily stopped, speech recognition operations are performed on the input speech by both the pattern recognition means, using the expanded second vocabulary, and the neural network means, using the first neural network, in parallel, results of the respective recognition operations are assigned probability values, the probability values are compared, the result having the highest probability value is selected as the match, and the reconfiguration of the neural network is subsequently continued.

10. The speech recognition apparatus according to claim 7, wherein the neural network comprises at least an input layer, a hidden layer and an output layer;

wherein the input layer contains a speech pattern to be recognized, the input layer comprising a two-dimensional array of M by N neural elements, where M is the number of feature vectors derived from an input speech signal, and N is the number of frequency-dependent coefficients per feature vector, a first dimension of the array corresponding to time, a second dimension of the array to frequency, the amplitude of the feature vectors being a time-frequency energy density;

wherein the hidden layer comprising a two-dimensional array, each element of the hidden layer array being formed from a differently weighted sum value of the amplitudes of a portion of the input layer having a size of LH by LV, where LH is less than M, and LV is less than N, adjacent portions overlapping one another by half in the time dimension, a ratio of the number of elements of the input layer to the number of elements of the hidden layer being 10 to 1 in the frequency dimension; and wherein the output layer comprising a one-dimensional array whose elements are formed from weighted sum values of all elements of the hidden layer thereby representing full interconnection between the hidden layer and the output: layer, the element of the output layer having the greatest sum value corresponding to the speech pattern to be recognized.

* * * * *